Nov. 16, 1943.    R. F. STALLMAN    2,334,227
NEEDLE BEARING
Filed Aug. 9, 1941
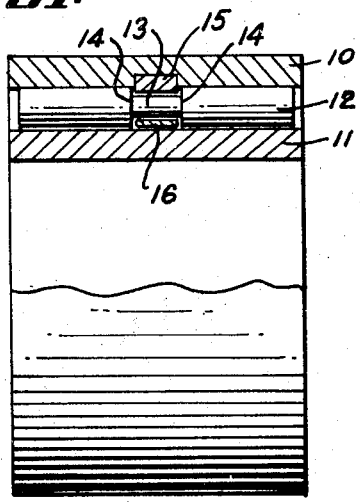
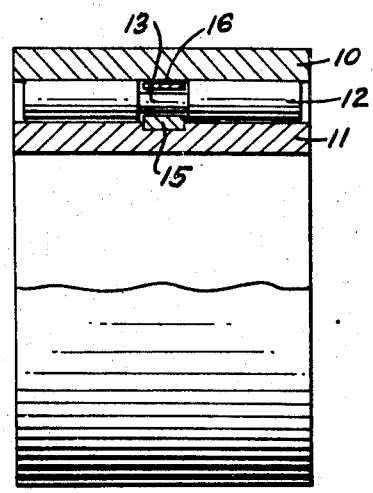
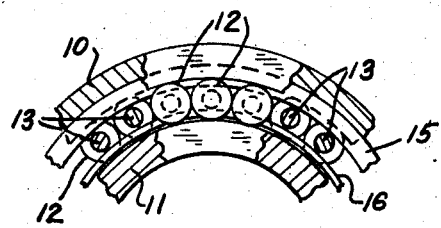
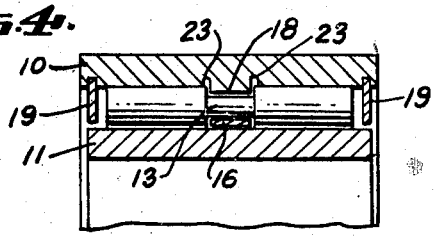
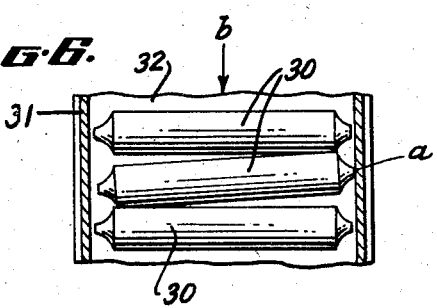
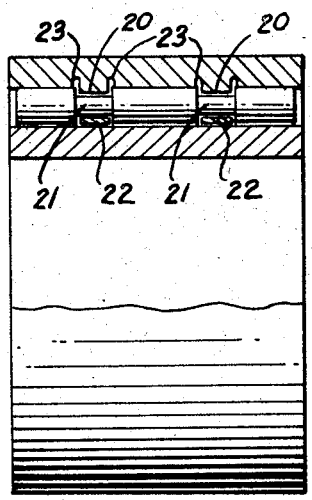
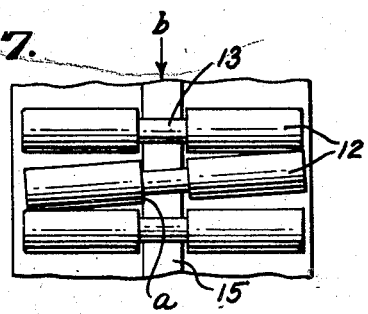
INVENTOR.
RALPH F. STALLMAN
BY
Castberg & Roemer
ATTORNEYS.

Patented Nov. 16, 1943

2,334,227

UNITED STATES PATENT OFFICE 2,334,227

NEEDLE BEARING

Ralph F. Stallman, Oakland, Calif.

Application August 9, 1941, Serial No. 406,161

9 Claims. (Cl. 308—212)

The present invention relates to needle bearings or quill bearings, as they are sometimes termed, and particularly to a bearing having a novel construction for retaining the needle rolls against endwise movement relative to the races between which they act as anti-friction members.

The conventional needle bearing consists essentially of an inner race, an outer race and a plurality of elongated rolls or needles disposed in and substantially filling the annular space between the races. In order to prevent endwise movement of the rolls and to confine them to their place between the races, one race, usually the outer one, is provided with a flange at each end which limits the movement of the rolls in the direction of their own length. It is also customary to provide means to prevent the rolls from falling out of place when the inner race is temporarily removed. This is accomplished by reducing the diameter of the rolls at both ends and placing a small collar over their reduced ends. These collars are usually secured to or formed integrally with the flanges formed at the ends of the race. The flanges and collars which retain the needles in place have been made in many different forms and styles, but in all cases, any tendency of the needles to move endwise results in their engagement with one of the flanges adjacent their ends. Because of this fact, needle bearings, which in theory, are capable of sustaining very heavy loads have become recognized in the bearing trade as unsuited to any but very light service where continuous rotation is encountered and are confined in use principally to installations where rocking or oscillating movement takes place. This is explained by the fact that in bearings of the needle type there is a tendency for the needles to become misaligned with the axis of rotation and to scrape at one end against the flange which is provided to prevent their endwise movement. This misalignment is transmitted from needle to needle until most, if not all, of them are crowding toward one end of the bearing assembly. The cumulative effect of this endwise force produces excessive friction and heat which will be destructive to the bearing and the thrust action set up is often so great as to separate the bearing parts by feeding the inner race along the shaft on which it is mounted.

It is the object of the present invention to overcome all of the above mentioned disadvantages and to provide a needle type bearing in which the needles are retained in place against either the inner or outer race, as may be required by different service, by simple and inexpensive means and by means which will obviate the necessity of difficult grinding operations in the manufacture of the bearing races.

A further object of the invention is the provision of a needle type bearing in which the thrust action set up by misalignment of the needles is minimized and is self-correcting through the roll action of the bearing.

Further objects and advantages of the invention are made apparent in the following specification wherein reference is made to the accompanying drawing in which the invention is exemplified. In the drawing Fig. 1 is a side elevation of a bearing constructed in accordance with the present invention, the upper half thereof being illustrated in longitudinal section, Fig. 2 is a similar view of a modified form of the same type of bearing, Fig. 3 is a fragmentary view in the end elevation of the bearing shown in Fig. 1, parts being illustrated in section, Fig. 4 is a view like Figs. 1 and 2 of a further modification in construction, Fig. 5 is a similar view illustrating a still further modification, Fig. 6 is a diagrammatic view of needles in a conventional needle bearing for illustration of the effect of misalignment thereof, and Fig. 7 is a diagrammatic view of needles in a bearing constructed in accordance with the present invention for illustration of the result of misalignment.

In Figs. 1 to 5 of the drawing, the bearings illustrated are shown as having an outer race 10 and an inner race 11 between which are disposed a plurality of needles 12. The needles 12, as shown in Figs. 1 to 4, are formed with a reduced central portion 13, the formation of which produces on each needle a pair of opposed inwardly facing shoulders 14. The outer race 10, as illustrated in Fig. 1, is provided with a central annular groove within which is fitted a ring 15 of somewhat greater thickness than the depth of the groove by which it is received so that it projects toward the reduced portions 13 of the needles and occupies the space between the shoulders 14. The ring 15 is a split ring with just sufficient gap to permit of its being closed to a diameter that will be received by the outer race so that it may be snapped into place within the groove by which it is retained. The needles 12 are thus retained against endwise displacement by engagement of their shoulder 14 with the ring 15.

The inner race normally retains the needles in place against the outer race and in order to retain them in their proper position in the event of removal of the inner race, a split ring 16 is received in the area formed by the reduced portions 13. This ring is normally of a size to fit within the reduced portions and is provided with a gap of sufficient magnitude to permit of its contraction for assembling.

Fig. 3 illustrates the relative positions of the needles, the ring 15 and the ring 16, and shows the inner surface of the ring 16 to be spaced sufficiently from the inner race 11 to prevent frictional contact therewith. The rings are both preferably slightly spaced from the peripheries of the reduced portions 13 of the needles.

In Fig. 2 the assembly shown is the same as that shown in Fig. 1 with the exception of the positions of the rings 15 and 16, which have been reversed. In this figure the ring 15 is received by a groove in the outer periphery of the inner race 11 and the ring 16 serves to hold the needles in place against the inner race when the outer race is removed. The construction illustrated in Fig. 1 is preferable where the bearing is used on a revolving shaft and the construction of Fig. 2 is preferred where the shaft is stationary and a member carried by the outer race of the bearing revolves. In both cases, the theory of operation of the bearing is identical.

Fig. 4 is an illustration of a further modification of the invention wherein the ring 15, which serves to prevent endwise movement of the needles, is replaced by a ring 18 which is formed as an integral part of the outer race rather than as a separate ring. The construction shown in Fig. 4 may also be reversed so that the ring 18 is formed on the outer periphery of the inner race, corresponding to the disclosure of Fig. 2. This figure also shows the application of grease seals or oil retainers to the bearing in the form of rings 19, supported in grooves formed adjacent the outer edges of the inner periphery of the race 10 and extending toward the inner race 11. These rings 19 may be split rings snapped into place, or may be constructed and applied in accordance with any conventional method.

In Fig. 5 a modified form of the invention is shown wherein two rings shown at 20 are formed integrally with the bearing race and project into two corresponding reduced portions 21 of the needles. The usual retaining rings 22 are provided and it is also possible in this construction to reverse the arrangement forming the rings 20 on the outer periphery of the inner race 11. Furthermore, the invention is not limited to any particular number of the rings 20, as three or even more may be desirable for certain types of bearings. Removable rings of the type shown at 15 in Figs. 1 and 2 may be used in place of the rings 20.

In both Figs. 4 and 5, wherein the rings 18 and 20 are shown as formed integrally with the bearing race, the race adjacent the edges of the rings is shown as relieved at 23 to facilitate grinding, it being understood that the inner periphery of the race must be ground or otherwise finished to within a very small tolerance and by providing the relief grooves 23, it is possible to grind the entire remaining surface of the bearing race without the necessity of grinding into an inside corner. Because of the necessity of grinding the surfaces of the race, the forms of the invention illustrated in Figs. 1 and 2 are preferable as the grinding may be accomplished in these forms before the ring 15 is applied and without need of the care that must be taken in grinding up to the shoulders provided by rings 18 and 20, shown in Figs. 4 and 5.

The manner in which the present invention serves to relieve unnecessary friction and end thrust in needle bearings and the manner in which it automatically corrects any tendency towards thrust in either direction, is illustrated in Figs. 6 and 7, which show diagrammatically and in exaggerated form the results of misalignment in a conventional bearing and in a bearing of the present invention.

Referring to Fig. 6, needle rolls 30 of a conventional bearing are shown as positioned between the side flanges 31 of the conventional race 32. As illustrated, the central needle roll 30 has engaged one of the side flanges at the point $a$ with the result that it is frictionally retarded and its opposite end advances in the direction of the arrow $b$, which is the direction in which the needles are rolling over the surface of the race. This misalignment is naturally transmitted to all of the needles and during operation of the bearing, becomes increasingly acute and sets up excessive friction and thrust action against the flange 31.

Referring now to Fig. 7 wherein three needle rolls constructed in accordance with the present invention, are diagrammatically illustrated, the central needle roll has assumed the same misaligned position and has come into frictional engagement with the ring 15 at the point $a$. The needle rolls are in this case also rolling in the direction of the arrow $b$, but the force which tends toward misalignment takes place only between the point $a$ and the left hand end of the needle. This is less than one-half the length of the needle. On the other hand, the force tending to correct this misalignment, or advance the retarding position of the needle takes place between the point $a$ and the right hand end of the needle which is more than one-half its length. Consequently, the tendency in normal operation of the bearing is for the misaligned needle to assume proper alignment rather than to increase its angularity and transmit the same to all of the needles in the bearing.

The invention as herein disclosed is applied to a bearing having both an inner and an outer race. It is customary to manufacture bearings with an outer race only to run on a shaft which takes the place of the inner race, and also to manufacture bearings with an inner race only, with the inner periphery of a gear or pulley hub serving as the outer race. The present invention is adaptable to these uses as is apparent from the foregoing description and drawing and wherever the term "race" is used herein, it is intended to include any surface on which the rollers operate. Furthermore, while the invention has been described as applicable to needle bearings, it is equally adaptable to roller type bearings of all dimensions, it being understood that the principal difference between a needle or quill bearing and a roller bearing is the proportion of the rolls which in the former are long and narrow and in the latter are comparatively short and thick. Other variations in arrangement and construction of the parts herein disclosed may be made within the spirit and the scope of the appended claims.

Having thus described my invention, what I claim and desire to secure by Letters Patent is—

1. A bearing comprising an inner and outer race, one of said races being relatively stationary, rollers interposed between said races and each having a reduced portion adjacent its center, an annular groove formed in said relatively stationary race and a ring carried by said groove and projecting into the reduced portions of the rollers the other race having a smooth cylindrical surface.

2. A bearing comprising a rotatable inner race and a relatively stationary outer race, rollers interposed between said races and each having a reduced portion adjacent its center, an annular groove formed in the outer race and a ring carried by said groove and projecting into the reduced portions of the rollers the inner race having a smooth cylindrical surface.

3. A bearing comprising a rotatable inner race and a relatively stationary outer race, rollers interposed between said races and having aligned reduced portions intermediate their ends, a ring carried by the outer race and projecting into the reduced portions of the rollers to prevent their longitudinal movement and a second ring registering with and permanently contained within said reduced portions to hold the rollers in position in the outer race when the inner race is removed.

4. A bearing comprising a revolving race and a relatively stationary race, a plurality of rolls interposed between said races, and means carried by the stationary race only and engageable with the rolls intermediate their ends in the event they become misaligned with their normal position.

5. A bearing comprising a revolving race and a relatively stationary race, a plurality of rolls interposed between said races, and having reduced portions intermediate their ends, and means carried by the stationary race only and projecting into the reduced portion of the rolls to engage shoulders formed by said reduced portions in the event of misalignment of the rolls.

6. A bearing comprising a revolving race and a relatively stationary race, a plurality of rolls interposed between said races and having reduced portions intermediate their ends, said stationary race having an annular groove formed therein, and a ring carried by said groove and projecting into the reduced portion of the rolls, said revolving race presenting a smooth cylindrical surface to the rolls.

7. A bearing comprising a revolving race and a relatively stationary race, a plurality of rolls interposed between said races and having reduced portions intermediate their ends, said stationary race having an annular groove formed therein, and a resilient split ring snapped into said groove and projecting into the reduced portion of the rolls, said revolving race presenting a smooth cylindrical surface to the rolls.

8. A bearing comprising a revolving race and a relatively stationary race, a plurality of rolls interposed between said races and having reduced portions intermediate their ends, said stationary race having an annular groove formed therein, a ring carried by said groove and projecting into the reduced portion of the rolls, and a second ring contained by the said reduced portions of the rolls adjacent the rotating race to retain the rolls in place against the stationary race when the races are separated, said revolving race presenting a smooth cylindrical surface to the rolls.

9. A bearing comprising a cylindrical inner race and an outer race, a plurality of rolls having reduced portions intermediate their ends interposed between said races, a ring carried by the outer race and registering within the reduced portion of the rolls to engage the rolls in the event they become misaligned with their normal position and a second ring contained by said reduced portions of the rolls adjacent the inner race to retain the rolls in place against the outer race when the races are separated.

RALPH F. STALLMAN.